(12) United States Patent
Zhang et al.

(10) Patent No.: US 6,716,552 B2
(45) Date of Patent: Apr. 6, 2004

(54) SECONDARY LITHIUM BATTERY CONSTRUCTION FOR IMPROVED HEAT TRANSFER

(75) Inventors: Zhengming Zhang, Charlotte, NC (US); Pankaj Arora, Charlotte, NC (US)

(73) Assignee: Celgard Inc., Charlotte, NC (US)

(*) Notice: Subject to any disclaimer, the term of this patent is extended or adjusted under 35 U.S.C. 154(b) by 102 days.

(21) Appl. No.: 09/726,633

(22) Filed: Nov. 30, 2000

(65) Prior Publication Data

US 2002/0064706 A1 May 30, 2002

(51) Int. Cl.⁷ .............. H01M 2/22; H01M 2/26
(52) U.S. Cl. .................. 429/94; 429/120
(58) Field of Search .............. 429/94, 164, 171, 429/120

(56) References Cited

U.S. PATENT DOCUMENTS

| | | | |
|---|---|---|---|
| 4,874,680 A | * 10/1989 | Koshiba et al. | 429/330 |
| 4,980,250 A | * 12/1990 | Takahashi et al. | 429/217 |
| 5,368,958 A | * 11/1994 | Hirai et al. | 429/211 |
| 5,443,925 A | * 8/1995 | Machida et al. | 429/176 |
| 5,683,834 A | * 11/1997 | Fujimoto et al. | 429/221 |
| 5,958,620 A | * 9/1999 | Nagaura | 429/164 |

FOREIGN PATENT DOCUMENTS

| | | | | |
|---|---|---|---|---|
| DE | 019849468 A1 | * 4/1998 | | H01M/4/64 |
| DE | 19849468 | 10/1999 | | |
| EP | 0822604 | 2/1998 | | |
| EP | 822604 A | * 2/1998 | ............ | H01M/2/02 |
| JP | 10340740 | 12/1998 | | |
| JP | 10340740 A | * 12/1998 | .......... | H01M/10/40 |

OTHER PUBLICATIONS

Hatchard, T.D. et al, "Importance of Heat Transfer by Radiation in Li–Ion Batteries during Thermal Abuse," Electrochemical and Solid–State Letters, vol. 3, No. 7, pp. 305–208 (2000).
UL1642—Standard for Lithium Batteries (Underwriters Laboratories Inc., 1st Edition Oct. 1985).
UL1642—Standard for Lithium Batteries (Underwriters Laboratories Inc., 2nd Edition Nov. 1992).
"Guideline for Safety Evaluation on Secondary Lithium Cells," Japan Storage Battery Association, Tokyo, Japan (1995).

* cited by examiner

*Primary Examiner*—Carol Chaney
(74) *Attorney, Agent, or Firm*—Robert H. Hammer, III, P.C.

(57) ABSTRACT

The instant invention is directed to a secondary lithium battery. The battery includes a negative electrode, a positive electrode, a separator sandwiched between the electrodes, an electrolyte impregnating the separator and being in a fluid communication with the electrodes, and a metal package adapted for containing the electrodes, the separator, and the electrolyte. One of the electrodes is in thermal contact with the package.

2 Claims, 2 Drawing Sheets

SECONDARY LITHIUM BATTERY CONSTRUCTION FOR IMPROVED HEAT TRANSFER

FIELD OF THE INVENTION

This invention is directed to the construction of a secondary, lithium battery.

BACKGROUND OF THE INVENTION

Lithium ion or secondary lithium batteries are known. See: Linden, D., Ed., *Handbook of Batteries 2nd Edition*, McGraw Hill Inc., New York, N.Y. (1995), Chapter 36; and Besenhard, J. O. Ed., *Handbook of Battery Material*, Wiley-VCH Verlag GmbH, New York, N.Y. (1999). These batteries are the state of the art power sources for portable electronic devices, such as: laptop computers, cellular phones, and the like. While these batteries have enjoyed an excellent safety record, efforts to improve their safety continues.

The safety concern arises from the threat of, for example, cell rupture arising from a thermal runaway situation. The cell's components, electrolyte and lithium containing electrodes, are packaged in a sealed metal can. In thermal runaway, heat is generated within the cell that could raise the temperature of the electrolyte and lithium electrodes above their ignition temperature. See: Hatchard, T. D. et al, "Importance of Heat Transfer by Radiation in Li-ion Batteries during Thermal Abuse," *Electrochemical and Solid State Letters*, vol. 3, no. 7, pages 305–308 (2000), incorporated herein by reference.

Thermal runaway may arise from several different situations, but those of concern here arise from "abuse" (or "thermal abuse"). Abuse is qualified by several standard tests including the "nail penetration" test, the "crush" test, and the "short circuit" test. See, for example, UL1642— Standard for Lithium Batteries (Underwriters Laboratories Inc., 1st Edition 10/1985 and 2nd Edition 11/1992); and "Guideline for Safety Evaluation on Secondary Lithium Cells," Japan Storage Battery Association, Tokyo, Japan (1995), both are incorporated herein by reference. In the first two mentioned tests, the cell is physically damaged thereby bringing about contact of the anode and cathode (a short circuit) which leads to thermal runaway. In the latter test, the anode and cathode are externally electrically coupled (a short circuit) which leads to thermal runaway.

In the short circuited battery, a localized heat spot begins forming within the cell. This heat accelerates the chemical reactions (between anode and cathode via electrolyte) going on within the cell which creates an escalating heat producing situation (the heat production is also rapid, e.g. seconds) that should be avoided because of the potential adverse consequences. The potential adverse consequences and the importance of heat transfer out of a cell is known. See: Hatchard, *Ibid.* In Hatchard, a label on the exterior of the package (can) is used to improve the heat transfer from the can. The label is used to regulate the internal temperature of the can.

In a conventional secondary lithium cell (either cylindrical or prismatic), the microporous separator membrane between the anode and cathode is wrapped several times around the exterior of the wound anode, cathode, separator, prior to its insertion into the package (can). These additional wraps of the separator act as an insulator (thermal and electrical). The electrode comprises an electrode active mix and a current collector. The current collector for the negative electrode (anode) is a copper foil. The current collector for the positive electrode (cathode) is an aluminum foil. The cans are made of iron-based materials (e.g. steel) or aluminum. In a conventional cylindrical cell, for example, an 18650 (18 mm diameter and 65 mm long), the electrode closest to the interior surface of the can is the negative electrode (anode), having a copper foil current collector, the can body which is made of the iron-based material is the negative terminal of the battery, while the lid of the can is the positive terminal. In the conventional prismatic cell, two constructions are recognized. First, the negative electrode (i.e. copper current collector) is closest to the interior surface of the can (i.e. iron-based). Second, the positive electrode (i.e. aluminum current collector) is closest to the interior surface of the can (i.e. aluminum).

SUMMARY OF THE INVENTION

The instant invention is directed to a secondary lithium battery. The battery includes a negative electrode, a positive electrode, a separator sandwiched between the electrodes, an electrolyte impregnating the separator and being in a fluid communication with the electrodes, and a metal package adapted for containing the electrodes, the separator, and the electrolyte. One of the electrodes is in thermal contact with the package.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

With regard to electrodes, electrolytes, and separators referred to herein, each is of conventional design or construction. Such information is known to the skilled artisan. For example, see: Linden, D., Ed., *Handbook of Batteries 2nd Edition*, McGraw Hill Inc., New York, N.Y. (1995), Clip 36, and Besenhard, J. O., Ed., *Handbook of Battery Materials*, Wiley-VCH Verlag GmbH (1999), e.g., § 2.6, 2.7, and the like, both are incorporated herein by reference.

The instant invention is disclosed with reference to a cylindrical cell for convenience, but it is not so limited and may be applied to prismatic cells as well.

Figure 1:
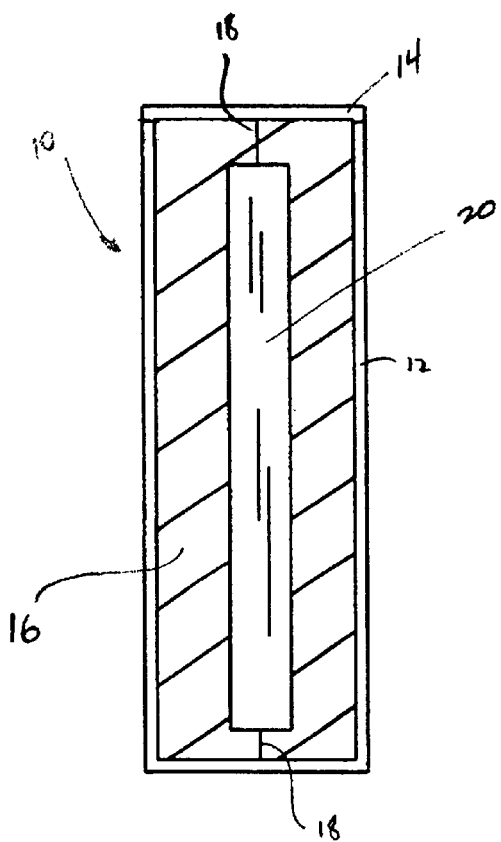
FIG. 1 is a cross-section view of a prior art cell.

Referring to the drawings wherein like numerals indicate like elements as shown in FIG. 1, a prior art cell 10 comprising a can 12 being closed by lid 14. A separator 16 is wrapped around a "jelly roll" and is in contact with the interior surface of can 12. A seam 18, created by overlapping the separator 16 upon itself as the battery is wound, is secured by a conventional piece of tape 20.

Figure 2:
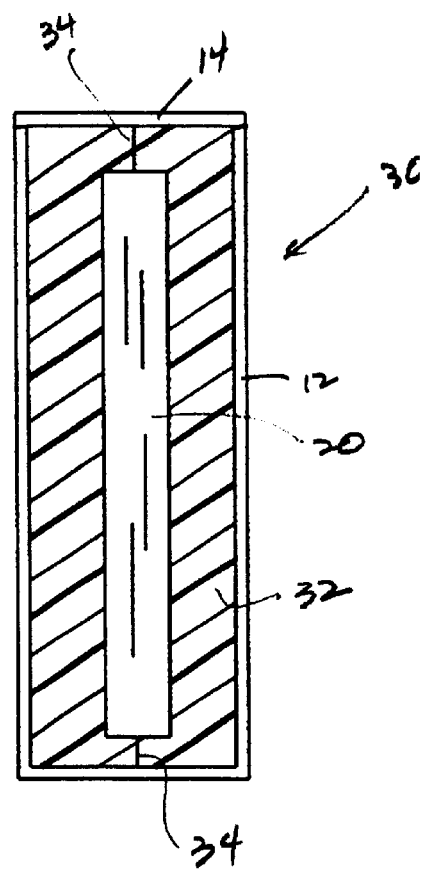
FIG. 2 is a cross-sectional view of a cell made according to the present invention.

In FIG. 2, the instant invention is illustrated. Cell 30 consists of a can 12 sealed with a lid 14. The metal sheet 32, typically a copper foil (i.e., the current collector) upon which the negative electrode material or electrode active mix (not shown, but conventional) has been spread in conventional manner, is in thermal contact (e.g., direct physical contact) with the interior surface of can 12.

Figure 3:
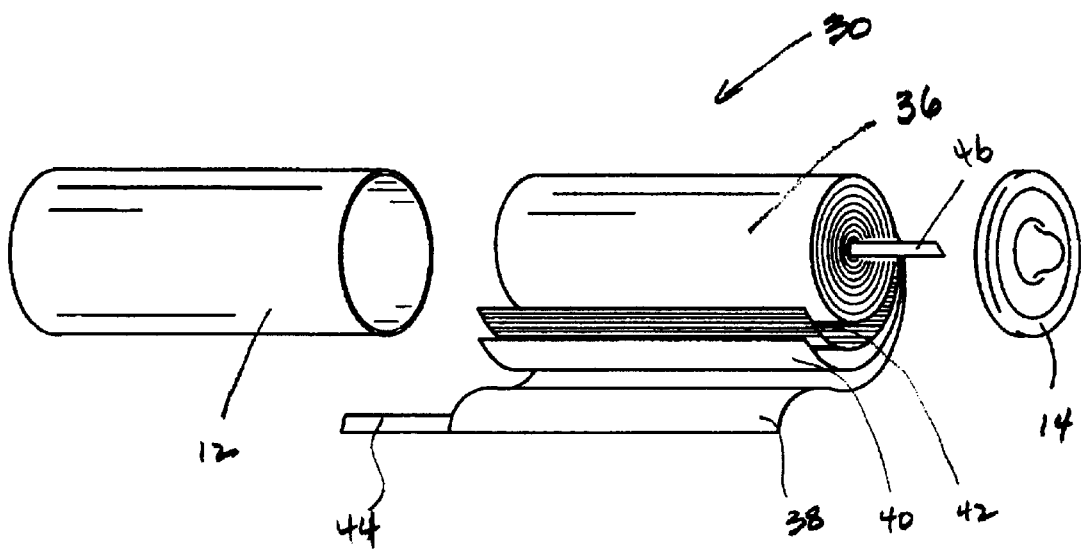
FIG. 3 is an exploded view of a cell made according to the present invention.

Referring to FIG. 3, the inventive cell 30 is illustrated in an exploded view. Jelly roll 36 is made in a conventional fashion with the exception that negative electrode 38 is longer than separator 40 or positive electrode 42. Thus, when the jelly roll is completely wound, the copper current collector 32 of the negative electrode 38 is visible. This jelly roll 36 is inserted into can 12, so that collector 32 of electrode 38 is in thermal contact with the interior surface of the can 12. Tab 44 may be welded, in a known manner, to can 12 and thereby provides good electrical contact, just as tab 46 may be welded to lid 14 to provide good electrical contact. In a prismatic cell, a copper current collector would be in contact with the can or an aluminum current collector would be in contact with the can.

The current collector 32 is an excellent heat conductor, so that heat generated in the interior of the jelly roll 36 may be efficiently transferred to the exterior surface of the metal can 12.

Figure 4:
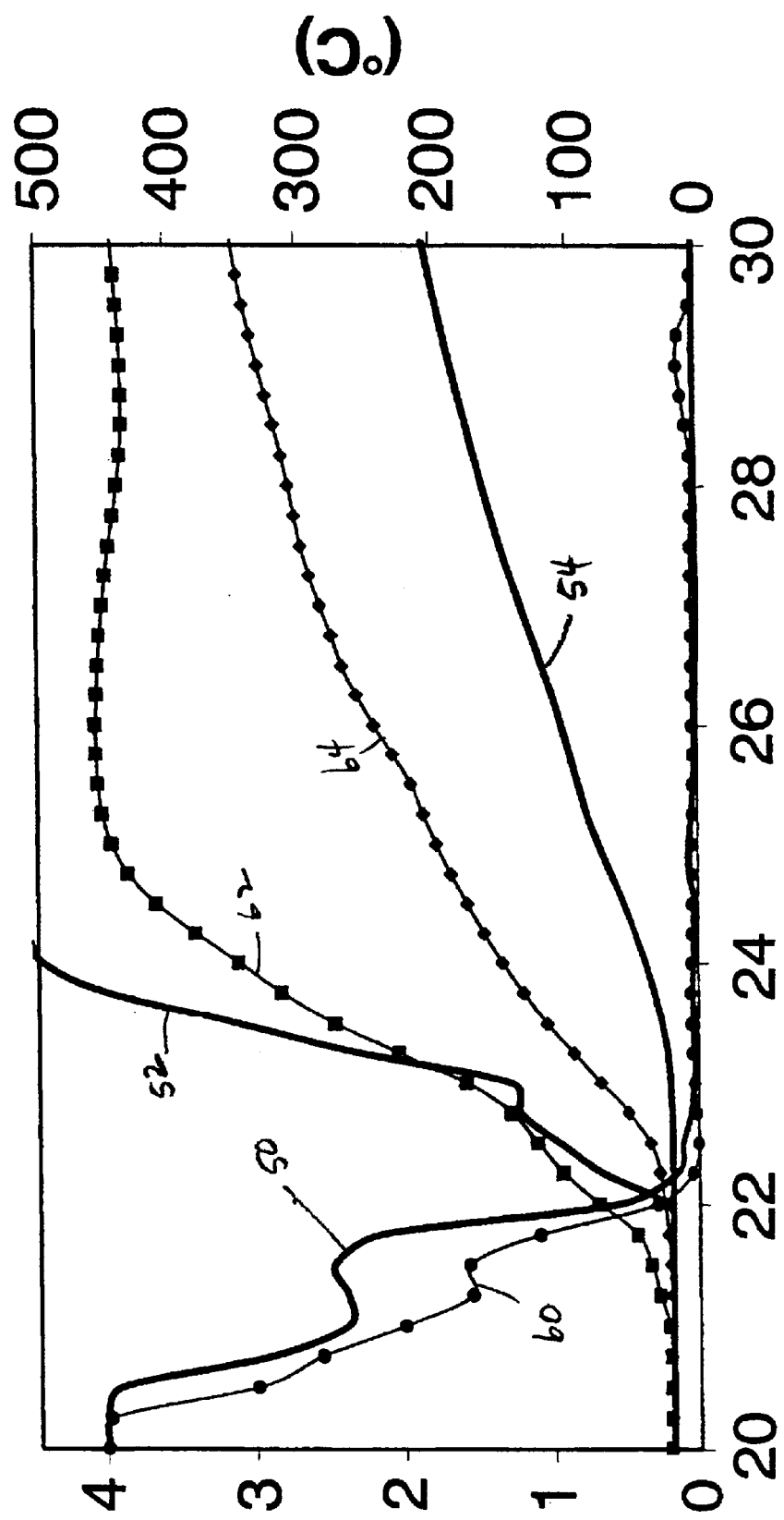
FIG. 4 is a graphical illustration of the performance (voltage and temperature) of a prior art cell and an inventive cell as a function of time.

The improvement in heat transfer is best understood with reference to FIG. 4. In FIG. 4, the performance (voltage and temperature) of the prior art cell and inventive cell is illustrated. The left-hand vertical axis indicates voltage (volts) as a function of time (seconds on the horizontal axis). The right-hand vertical axis illustrates temperature (centigrade) as a function of time (seconds on the horizontal axis).

The prior art cell's performance is illustrated with lines 50, 52 and 54. Line 50 illustrates the voltage as a function of time after the cell has suffered nail penetration (e.g., test method UL1642). Line 52 illustrates the temperature at the center of the jelly roll as a function of time. Line 54 illustrates the temperature at the exterior surface of the can as a function of time. Note, that as the voltage 50 drops, both temperature lines rise, but the interior temperature 52 rises more sharply in comparison to the exterior temperature 54. The difference between lines 52 and 54 shows that heat does not dissipate well from the cell. Remember FIG. 1, where separator 16, a plastic insulator, is in contact with can 12.

The inventive cell's performance is illustrated with lines 60, 62, and 64. Line 60 is the voltage, line 52 is the interior temperature, and line 64, the exterior temperature. Note that the difference between lines 62 and 64 is smaller than the difference shown with the prior art cell. The small temperature difference of the inventive cell shows that heat is dissipated better from the cell when the current collector is in thermal contact with the can.

The present invention may be embodied into others specific forms without departing from the attributes thereof and, accordingly, reference should be made to the pending claims rather than to the foregoing specification as indicating the scope of the invention.

What is claimed is:

1. A secondary lithium battery comprising:

a cylindrical or prismatic configuration having a negative electrode comprising a copper current collector, an electrode active mix on said collector, and a tab affixed to said collector, a positive electrode comprising a current collector, an electrode active mix on said collector, and a tab affixed to said collector, a microporous separator membrane between said electrodes, an electrolyte impregnating said separator and being in fluid communication with said electrodes, a metal package, adapted for containing said electrodes, said separator, and said electrolyte, comprises a can having an interior surface and a lid, one said tab being electrically connected to said can and said other tab being electrically connected to said lid, and said copper current collector being in direct thermal contact with a substantial portion of said interior surface of said can.

2. In a rechargeable lithium battery having a negative electrode comprising a copper current collector, an electrode active mix on said collector, and a tab affixed to said collector, a positive electrode comprising a current collector, an electrode active mix on said collector, and a tab affixed to said collector, a microporous separator membrane between said electrodes, an electrolyte impregnating said separator and being in fluid communication with said electrolytes, and a metal package, adapted for containing said electrolytes, said separator and said electrolyte, comprises a can having an interior surface and a lid, one said tab being electrically connected to said can and said other tab being electrically connected to said lid, wherein said improvement comprising:

said copper current collector being in direct thermal contact with a substantial portion of said interior surface of said can.

* * * * *